United States Patent
Hallitschke et al.

(10) Patent No.: US 12,429,189 B2
(45) Date of Patent: *Sep. 30, 2025

(54) MINI OR MICRO LED-BASED LIGHT MODULE CONFIGURED TO PERFORM PLURAL LIGHT FUNCTIONS SEAMLESSLY WITH DIFFERENT LIGHT GUIDES IN UNITARY ASSEMBLY

(71) Applicant: Autosystems, a division of Magna Exteriors Inc., Aurora (CA)

(72) Inventors: Frank Hallitschke, Backnang (DE); Julian Knutzen, Toronto (CA); Gianpiero Fusco, Turin (IT); Blaine J. Dolcetti, Oxford, MI (US)

(73) Assignee: Autosystems, a division of Magna Exteriors Inc., Aurora (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,781

(22) Filed: May 28, 2024

(65) Prior Publication Data

US 2024/0310020 A1 Sep. 19, 2024

Related U.S. Application Data

(63) Continuation of application No. 17/985,346, filed on Nov. 11, 2022, now Pat. No. 12,025,287.

(60) Provisional application No. 63/285,847, filed on Dec. 3, 2021.

(51) Int. Cl.
*F21S 43/20* (2018.01)
*F21S 43/14* (2018.01)
*F21S 43/15* (2018.01)

(52) U.S. Cl.
CPC ............. *F21S 43/26* (2018.01); *F21S 43/14* (2018.01); *F21S 43/15* (2018.01); *F21S 43/255* (2018.01); *F21S 43/2605* (2024.05)

(58) Field of Classification Search
CPC .................. F21S 43/20; F21S 43/26
See application file for complete search history.

(56) References Cited

U.S. PATENT DOCUMENTS 9,677,735 B2 * 6/2017 Hardy ............... F21S 43/33
2005/0024887 A1 * 2/2005 Boxler ............... F21S 43/26
359/742

(Continued)

*Primary Examiner* — Eric T Eide
(74) *Attorney, Agent, or Firm* — DICKINSON WRIGHT PLLC

(57) ABSTRACT

A multi-function light module includes: a plurality of light emitting diodes (LEDs) chosen from mini-LEDs, micro-LEDs and LED-dies and including a first group of the plurality of LEDs mounted on a substrate, and a second group of the plurality of LEDs mounted on the substrate; a printed circuit board (PCB) with a second plurality of LEDs configured for a first function; and a lens overlying each of the multi-function light module and the PCB. An optics assembly includes a first optic component configured for the first function and second optic component configured for a second function that is different from the first function. The optics assembly is arranged to guide light output from respective LEDs of the first group of the LEDs via the first optic component and to guide light output from respective LEDs of the second group of the LEDs via the second optic component.

20 Claims, 10 Drawing Sheets

(56) References Cited

U.S. PATENT DOCUMENTS

2014/0133142 A1\* 5/2014 Jorgensen ................. F21V 5/04
  362/232
2019/0118702 A1\* 4/2019 Shikata ................... F21S 43/30

\* cited by examiner

MINI OR MICRO LED-BASED LIGHT MODULE CONFIGURED TO PERFORM PLURAL LIGHT FUNCTIONS SEAMLESSLY WITH DIFFERENT LIGHT GUIDES IN UNITARY ASSEMBLY

CROSS-REFERENCE TO RELATED APPLICATIONS

This utility application is a continuation of U.S. non-provisional application Ser. No. 17/985,346, filed Nov. 11, 2022 and claims the benefit of U.S. Provisional Application No. 63/285,847 filed Dec. 3, 2021. The entire disclosures of the above applications are incorporated herein by reference.

FIELD

The present disclosure relates to generally to a mini or micro light emitting diode (LED)-based, or unpackaged LED-die based, light module providing plural light functions having different light optics in a unitary assembly. The present disclosure further relates generally to the unitary LED-die based vehicle light module providing two or more vehicle light operations that require different optics such as a diffused light function and a focused light function.

BACKGROUND

It is known to employ semiconductor light sources, in particular light emitting diodes (LEDs), in automotive signal lights. For example, tail lights on some vehicles include an array of red light-emitting and/or amber light-emitting LEDs which are positioned between a reflector and a lens to provide the desired signal patterns. It is also known to have signal lamps wherein one or more LEDs are arranged in a direct view wherein the output of the LED passes directly through the lens of the signal light.

While known signal lights employing LEDs provide advantages over signal lights employing incandescent bulbs, they still suffer from some problems. For example, available LEDs emit limited amounts of light relative to incandescent lamps. Due to these lower emitted levels of light and/or the inefficiency of a conventional reflector and lens in transmitting the light produced by the LEDs, a large number of LEDs must often be employed to produce sufficient signal lighting to meet regulatory requirements. Further, this large number of LEDs must be appropriately spaced about the signal light to provide the lighted surface area required to meet regulatory requirements and thus the aesthetic design of such signal lights is limited.

As will be apparent, next to regulatory and safety concerns, aesthetic design can be one of the most significant considerations for the designer of a vehicle and, to date, the range of aesthetic design available for signal lamps using semiconductor light sources has been limited. For example, conventional vehicle LED lighting solutions provide a fog function with a dedicated space inside a vehicle lamp, or as an additional light placed entirely apart from the tail light (e.g., in the bumper), because the volume needed to realize a rear fog function is too large to allow a fog function to be integrated into another light function and hidden until lit. The dedicated space needed for a fog function inside or outside a vehicle lamp is not desirable from an aesthetic design perspective.

SUMMARY

This section provides a general summary of the present disclosure and is not a comprehensive disclosure of its full scope or all of its features, aspects and objectives.

An exterior vehicle lighting assembly is provided. The exterior vehicle lighting assembly includes a multi-function light module. The multi-function light module includes: a plurality of light emitting diodes (LEDs) chosen from mini-LEDs, micro-LEDs and LED-dies and including a first group of the plurality of LEDs mounted on a substrate, and a second group of the plurality of LEDs mounted on the substrate; a printed circuit board (PCB) with a second plurality of LEDs configured for a first function; and a lens overlying each of the multi-function light module and the PCB. The multi-function light module further includes an optics assembly with a first optic component configured for the first function and second optic component configured for a second function that is different from the first function. The optics assembly is disposed relative to the plurality of LEDs to guide light output from respective LEDs of the first group of the plurality of LEDs via the first optic component and to guide light output from respective LEDs of the second group of the plurality of LEDs via the second optic component.

In some embodiments, the exterior vehicle lighting assembly presents a uniform appearance across the multi-function light module and the PCB with each of the first group of the plurality of LEDs and the second plurality of LEDs each being illuminated for the first function.

In some embodiments, the second function of the multi-function light module includes at least one of: a brake light function, a turn signal function, a daytime running light function, a headlight function, a tail light function, a front fog light function, or a rear fog light function.

In some embodiments, the multi-function light module is surrounded on at least two opposite sides by one or more other light modules, and wherein the one or more other light modules include the PCB with the second plurality of LEDs.

In some embodiments, the first group and the second group of the plurality of LEDs of the multi-function light module are configured to be operated at different intensities depending on a corresponding one of the first function or the second function to be achieved.

In some embodiments, the first group of the plurality of LEDs are interspersed with the second group of the plurality of LEDs to present a uniform appearance with only one of the first group of the plurality of LEDs or the second group of the plurality of LEDs being illuminated.

In some embodiments, the second optic component comprises a plurality of collimators and a plurality of pillow lenses, each collimator of the plurality of collimators has an input portion configured to receive light from a corresponding LED of the second group of the plurality of LEDs, and each pillow lens of the plurality of pillow lenses is disposed at an output of a corresponding collimator of the plurality of collimators to receive collimated light therefrom.

In some embodiments, the second optic component is arranged on an optic substrate, and wherein the optic substrate defines cutouts in areas that are aligned with corresponding LEDs of the first group of the plurality of LEDs.

A tail light assembly for a vehicle is provided. The tail light assembly includes a multi-function light module. The multi-function light module includes: a plurality of light emitting diodes (LEDs) chosen from mini-LEDs, micro-LEDs and LED-dies and including a first group of the plurality of LEDs mounted on a substrate, and a second group of the plurality of LEDs mounted on the substrate; and a printed circuit board (PCB) with a second plurality of LEDs and configured to provide a tail light function. The multi-function light module further includes an optics assembly with a first optic component configured for the tail light function and second optic component configured for a second function that is different from the tail light function. The optics assembly is disposed relative to the plurality of LEDs to guide light output from respective LEDs of the first group of the plurality of LEDs via the first optic component and to guide light output from respective LEDs of the second group of the plurality of LEDs via the second optic component.

In some embodiments, the second function of the multi-function light module includes at least one of: a brake light function, a turn signal function, or a rear fog light function.

In some embodiments, the tail light assembly further includes a lens overlying each of the multi-function light module and the PCB and presenting a uniform appearance across the multi-function light module and the PCB with the first group of the plurality of LEDs and with the second plurality of LEDs each illuminated for the tail light function.

In some embodiments, the first group and the second group of the plurality of LEDs of the multi-function light module are configured to be operated at different intensities depending on a corresponding one of the tail light function or the second function to be achieved.

A multi-function light module for a vehicle is provided. The multi-function light module includes: a plurality of light emitting diodes (LEDs) chosen from mini-LEDs, micro-LEDs and LED-dies and including a first group of the plurality of LEDs mounted on a substrate, and a second group of the plurality of LEDs mounted on the substrate; and an optics assembly with a first optic component configured for a first function and second optic component configured for a second function that is different from the first function. The optics assembly is disposed relative to the plurality of LEDs to guide light output from respective LEDs of the first group of the plurality of LEDs via the first optic component and to guide light output from respective LEDs of the second group of the plurality of LEDs via the second optic component. The first group of the plurality of LEDs are interspersed with the second group of the plurality of LEDs to present a uniform appearance with only one of the first group of the plurality of LEDs or the second group of the plurality of LEDs being illuminated.

In some embodiments, the second optic component comprises a plurality of collimators and a plurality of pillow lenses, each collimator of the plurality of collimators has an input portion configured to receive light from a corresponding LED of the second group of the plurality of LEDs, and each pillow lens of the plurality of pillow lenses is disposed at an output of a corresponding collimator of the plurality of collimators to receive collimated light therefrom.

In some embodiments, the plurality of pillow lenses are spaced apart from one another and interspersed with the first optic component configured for the first function.

In some embodiments, at least one of the first function or the second function of the multi-function light module includes at least one of: a brake light function, a turn signal function, a daytime running light function, a headlight function, a tail light function, a front fog light function, or a rear fog light function.

In some embodiments, the second optic component is arranged on an optic substrate, and wherein the optic substrate defines cutouts in areas that are aligned with corresponding LEDs of the first group of the plurality of LEDs.

In some embodiments, at least one of the first function or the second function diffuses light via a corresponding one of the first optic component or the second optic component, and another one of the first function or the second function collimates light via a corresponding one of the first optic component or the second optic component.

In some embodiments, at least one of the first optic component or the second optic component includes a light filter.

The present disclosure also provides a vehicle lighting module including the multi-function light module, and wherein the vehicle lighting module is configured to extend along a vehicle body structure.

It will be appreciated that any of the aspects of this summary can be combined with other aspects in this summary as well as with the various embodiments described below.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF EXAMPLE EMBODIMENTS

In accordance with example embodiments of the present disclosure, an advantageous multi-function lighting assembly 200 is provided that achieves high-performance, high-efficiency vehicle lighting with greater styling freedom (i.e., in terms of cost, aesthetics and versatility) than conventional vehicle lighting technologies. The multi-function lighting assembly 200 in accordance with example embodiments of the present disclosure uses lighting technology wherein thin-film mini LED dies or micro LED dies are applied to a surface with microscopic accuracy. A variety of different surfaces can be used, including a flexible or rigid surface or substrate. The multi-function lighting assembly 200 of the present disclosure aligns differing light guides or optics components to respective ones of the LED dies with increased granularity and accuracy than conventional LED technology to achieve two or more functions requiring different optics in the same lighting assembly. The multi-function lighting assembly therefore can achieve more distinctive and stylized vehicle lighting with greater uniformity, and a broader range of applications, than conventional vehicle lighting technology.

Figure 1A:
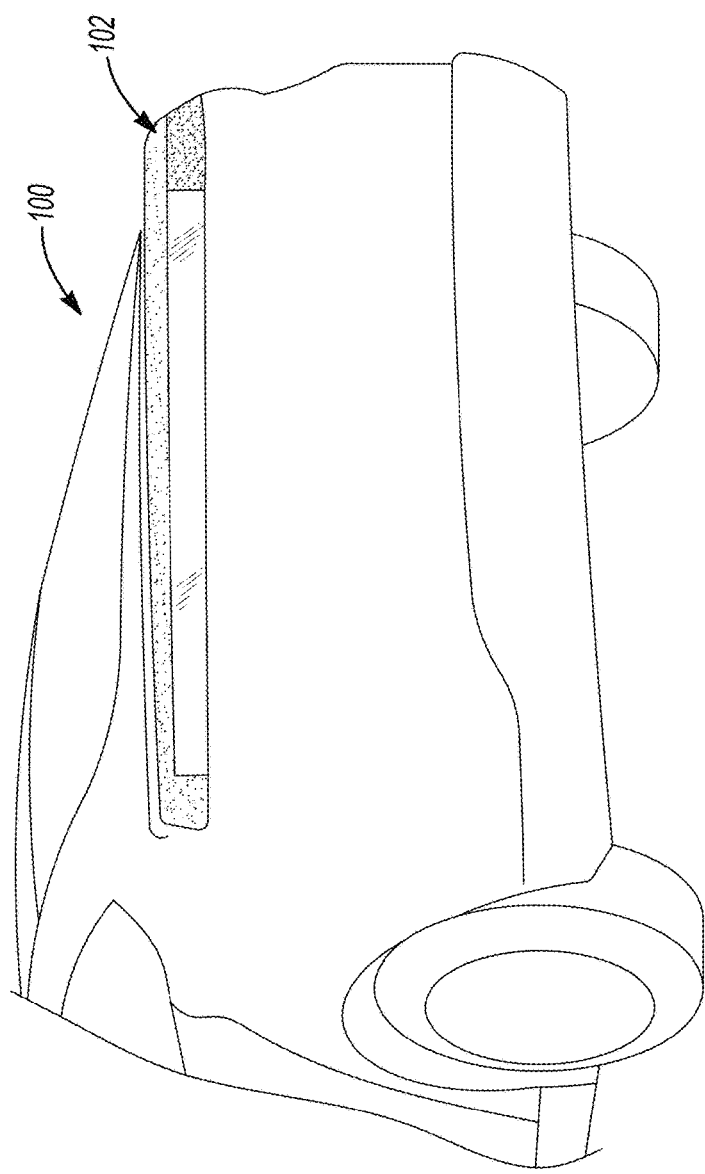
FIG. 1A is perspective view of a vehicle with a vehicle lighting module comprising a multi-function lighting assembly constructed in accordance with example embodiments.
Figure 1B:
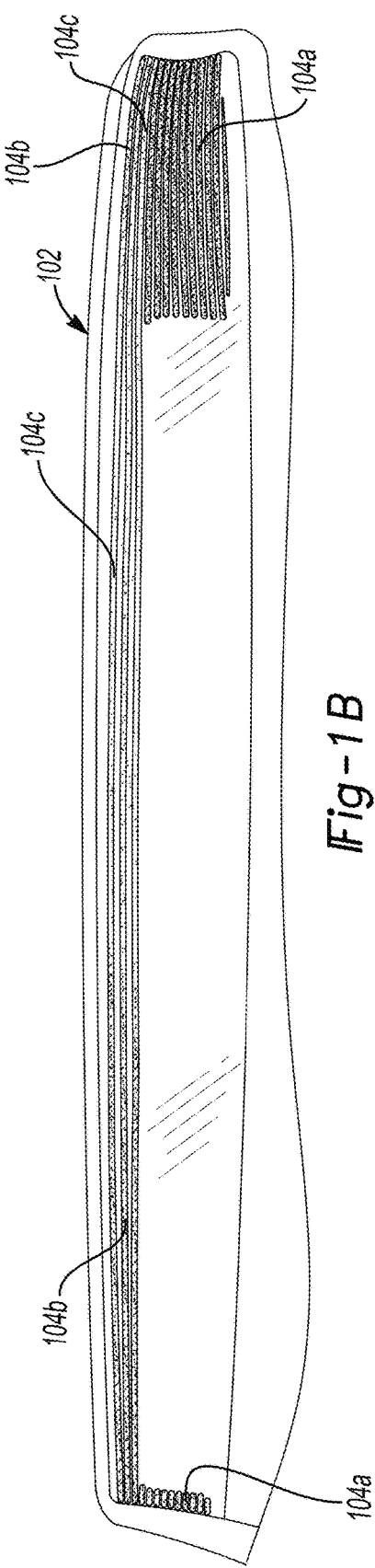
FIGS. 1B, 1C, 1D and 1E are example views of different light patterns generated from a multi-function lighting assembly constructed in accordance with example embodiments.

For example, with reference to FIGS. 1A through 1D, a vehicle 100 is shown with a rear vehicle lighting module 102. One or more of the multi-function lighting assembly 200 can be provided in the vehicle lighting module 102 to generate desired lighting patterns for different vehicle lighting operations such as, but not limited to, tail lights, turn signal indicators, brake lights and fog lights. For example, as shown in FIG. 1B, One or more of the multi-function lighting assembly 200 can be controlled to drive respective ones of LED dies in accordance with a first lighting function 104a (e.g., brake lights), to drive other respective ones of LED dies in accordance with a second lighting function 104b (e.g., tail lights), and to drive yet another group of respective ones of LED dies in accordance with a third lighting function 104c (e.g., turn signal indicator). It is to be understood that that the one or more of the multi-function lighting assembly(ies) 200 can be provided in a front vehicle lighting module 102 to generate desired lighting patterns for different vehicle lighting operations such as, but not limited to, daytime running lights, headlights, turn signal indicators, and fog lights.

The multi-function lighting assembly(ies) 200 can be provided in a vehicle lighting module 102 that extends along a vehicle body surface such as along a lift gate surface, bumper surface or other vehicle body surface. Since the substrate with the LED-dies in the multi-function lighting assembly 200 can be flexible, the substrate and its LED-dies can conform to the shape and contours of a vehicle 100. As seen in FIGS. 1B and 1E, the substrate of the multi-function lighting assembly 200 can disposed so that its LED dies are visible from the sides as well as from the back of the vehicle.

Figure 1C:
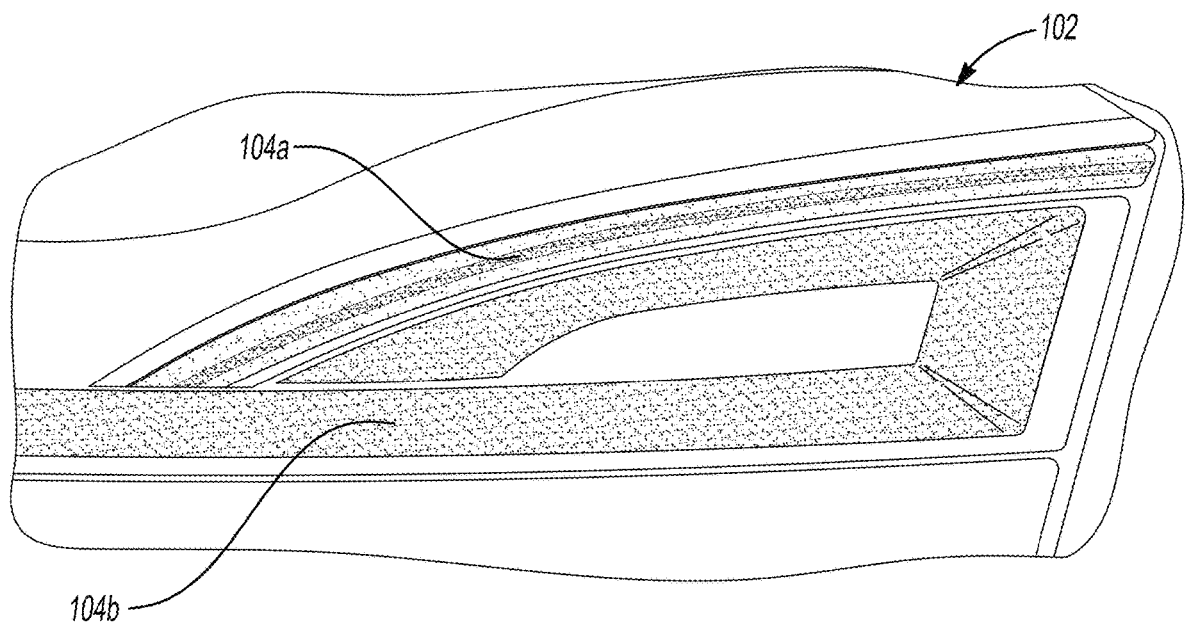
Figure 1D:
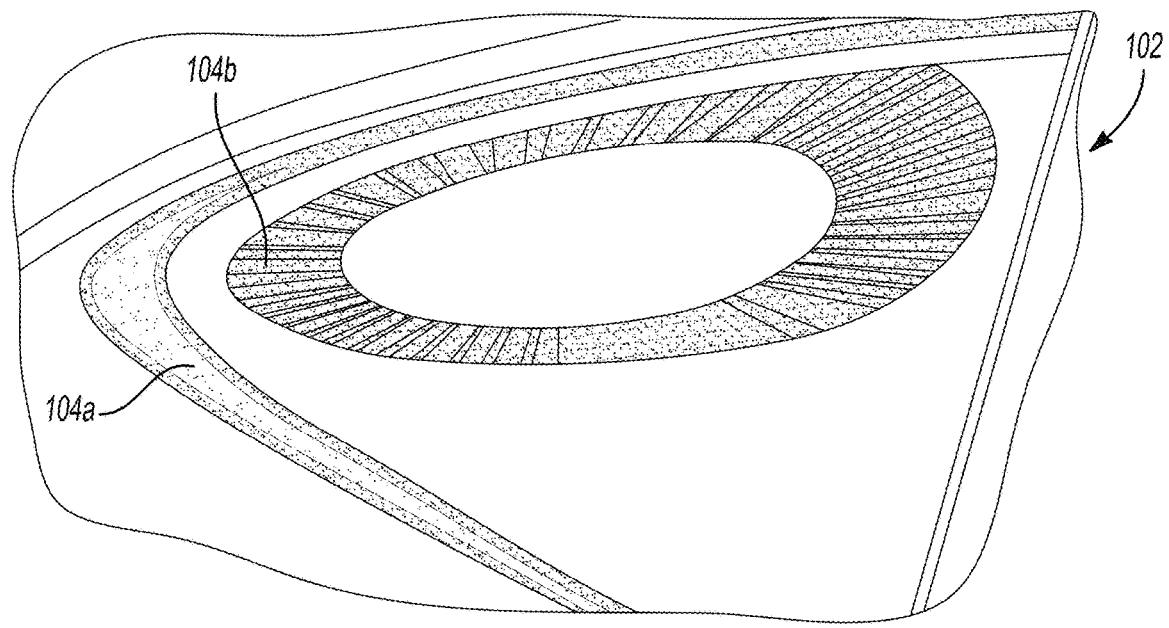
Figure 1E:
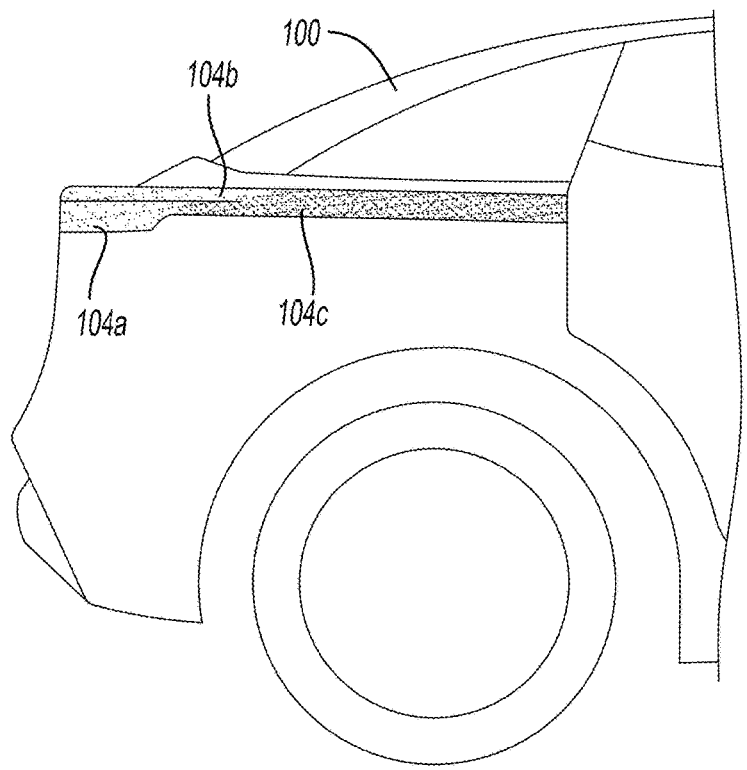

As illustrated in FIGS. 1C and 1D, the groups of LED dies controlled for respective multiple lighting functions can be selected such that the LED dies for a first lighting feature or function 104a are disposed in an area of the substrate that does not overlap or intermingle with LED dies disposed in a different area of the substrate that are controlled for a second lighting feature or function 104b. Alternatively, as illustrated in FIGS. 1B and 1E in accordance with another example embodiment of the present disclosure, the LED dies controlled for a first lighting feature or function 104c can be disposed on the substrate of the multi-function lighting assembly 200 in a pattern such that they intermingle with LED dies controlled for different lighting feature or function 104b. As explained further below in connection with FIG. 2, the mini LED dies or micro LED dies $204_{1,\ldots,n}$ used in the multi-function lighting assembly 200 are spaced densely such that alternate LED dies 204 can be switched off while driving other interspersed LED dies 204 and no black out regions occur for the switched off LED dies 204. Instead, the lighting feature comprising the driven LED dies 204 retains a uniform appearance, which is one of the reasons why the multi-function lighting assembly 200 is advantageous for achieving distinctive and stylized vehicle lighting with uniformity for a broader range of vehicle lighting applications. A uniform lighting surface across the a lighting module 102 creates an elegant uniform lighting appearance for exterior tail and brake functions, with sleek dynamic motion for turn signal lighting, for the example shown in FIGS. 1B and 1E.

Figure 2:
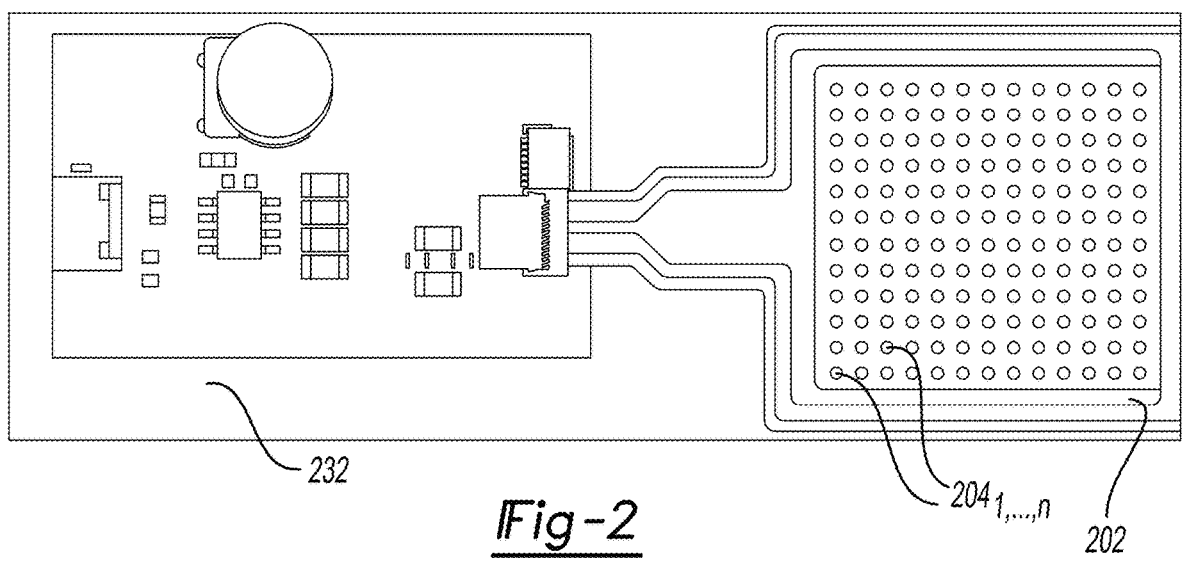
FIG. 2 depicts an example arrangement of light generators such as mini or micro light emitting diodes (LEDs) or unpackaged LED dies in a multi-function lighting assembly constructed in accordance with example embodiments.

In accordance with aspects of illustrative embodiments, the multi-function lighting assembly 200 employs an array of deposited LED dies $204_{1,\ldots,n}$ on a substrate 202 that are controllable and provided with different optics as needed for the two or more functions provided by the multi-function lighting assembly 200. With reference to FIG. 2, an example substrate 202 for a multi-function lighting assembly 200 is shown with a plurality of mini LED dies or micro LED dies $204_{1,\ldots,n}$ mounted thereon. An example LED die driver or controller(s) 232 is shown that is described further in connection with FIG. 8. For consistency, the use of the term LED herein generally indicates an unpackaged LED or LED die. An "unpackaged" LED refers to an unenclosed LED without protective features. For example, an unpackaged LED can refer to an LED die that does not include a plastic or ceramic enclosure, pins/wires connected to die contacts (e.g., for interfacing/interconnecting with ultimate circuitry), and/or a sealing (e.g., to protect the die from the environment).

In accordance with an advantageous aspect of example embodiments in the present disclosure, the multi-function lighting assembly 200 aligns differing light guides or optic components to respective ones of the LED dies $204_{1,\ldots,n}$ on a substrate 202 to achieve two or more functions requiring different optics in the same lighting assembly. For purposes of illustration, a non-limiting functional example is described with reference to FIGS. 3A through 7, wherein an example multi-function lighting assembly 200 provides a tail light function and a fog light function in an illustrative vehicle lighting module 102. This functional example is helpful to illustrate advantages of the multi-function lighting assembly 200 because these two functions require different optics; that is, the tail light function requires light output from LED dies 204 to be diffused whereas the fog light function requires light output from LED dies 204 to be focused (e.g., collimated). It is to be understood that the multi-function lighting assembly 200 can be configured to provide other combinations of two or more lighting functions such as, but not limited to, brake light and tail light functions, or brake light and turn signal indication functions.

Figure 3A:
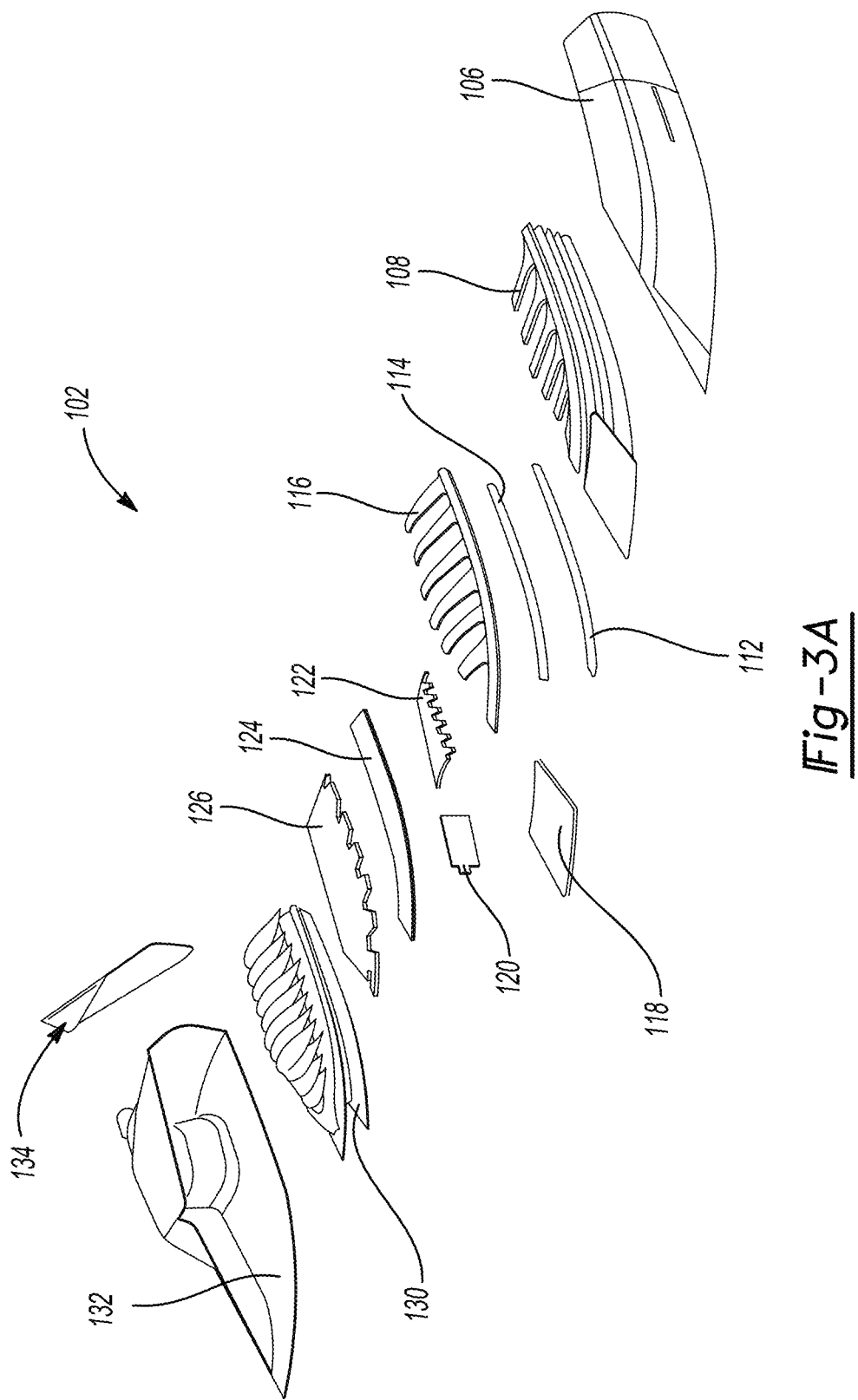
FIGS. 3A and 3B are, respectively, an exploded view of a conventional vehicle lighting module, and a perspective view of a vehicle lighting module comprising a multi-function lighting assembly constructed in accordance with example embodiments.
Figure 3B:
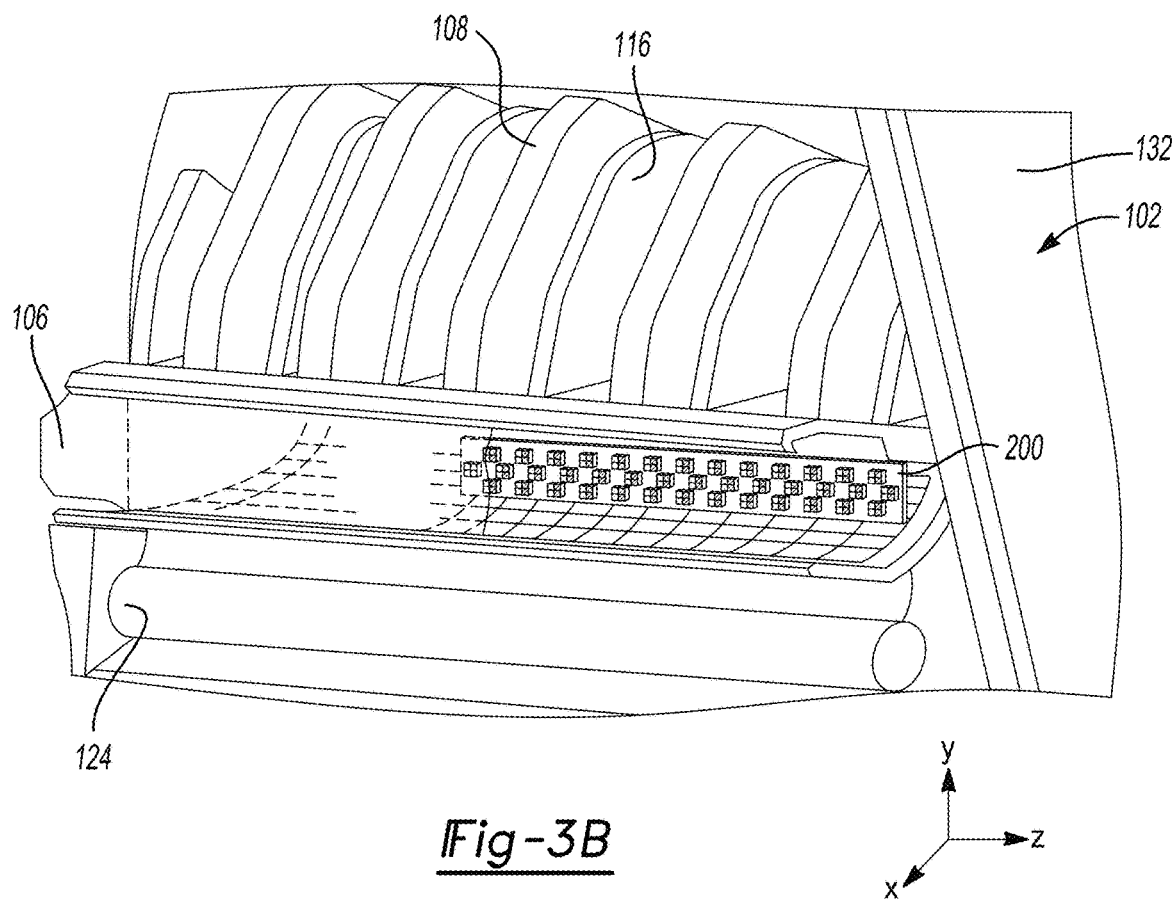

With reference to FIGS. 3A and 3B, an exploded view of a conventional vehicle lighting module 102 is shown in FIG. 3A, and FIG. 3B shows an example vehicle lighting module 102 having an example multi-function lighting assembly 200 deployed therein. For example, a conventional vehicle lighting module 102 can have a housing 132 and side bezel 134 and lens 106 enclosing an inner bezel 108, a reverse lens 112, a turn signal lens 114, a tail lens 116, a side reflex lens 118, a mother board 120, an LED board for reverse 122, an LED board for turn signal 124, an LED board for tail/stop signal 126, and a reflector group 130. The example vehicle lighting module 102 having an example multi-function lighting assembly 200 in FIG. 3B comprises a housing 132 enclosing different lighting assemblies such as an example multi-function lighting assembly 200 for two or more lighting functions (e.g., tail and fog) in accordance with an example embodiment, as well as conventional components for other lighting function(s) such as semiconductor lighting source(s) for stop, reverse and turn signaling, one or more lenses and/or reflector(s), cooling fins and/or heat sink(s), bezels and/or other structural supports, protective cover, among other components. The multi-function lighting assembly 200 is shown in FIG. 3B in a Y-Z plane wherein an X-plane is generally the light output direction from the rear of the vehicle for visibility by other vehicles and pedestrians behind the vehicle 100.

Figure 4A:
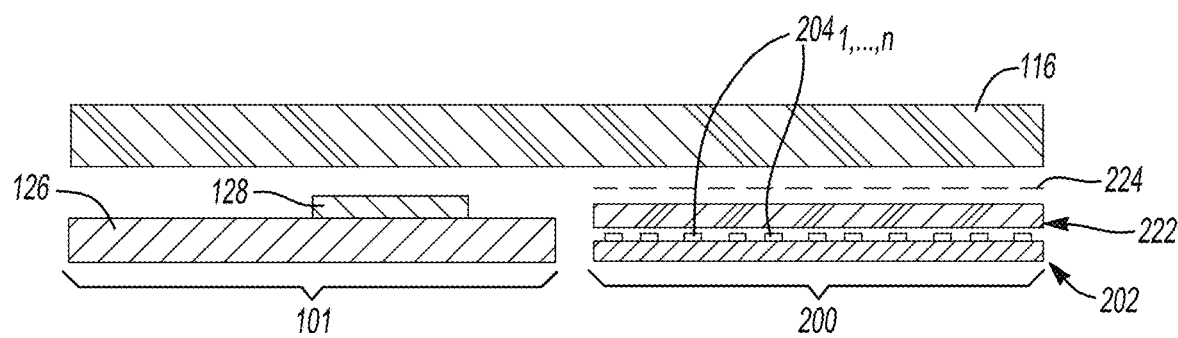
FIG. 4A is a cross-section view comparison of thicknesses of a conventional LED-based lamp tail, and a multi-function lighting assembly constructed in accordance with example embodiments.
Figure 4B:
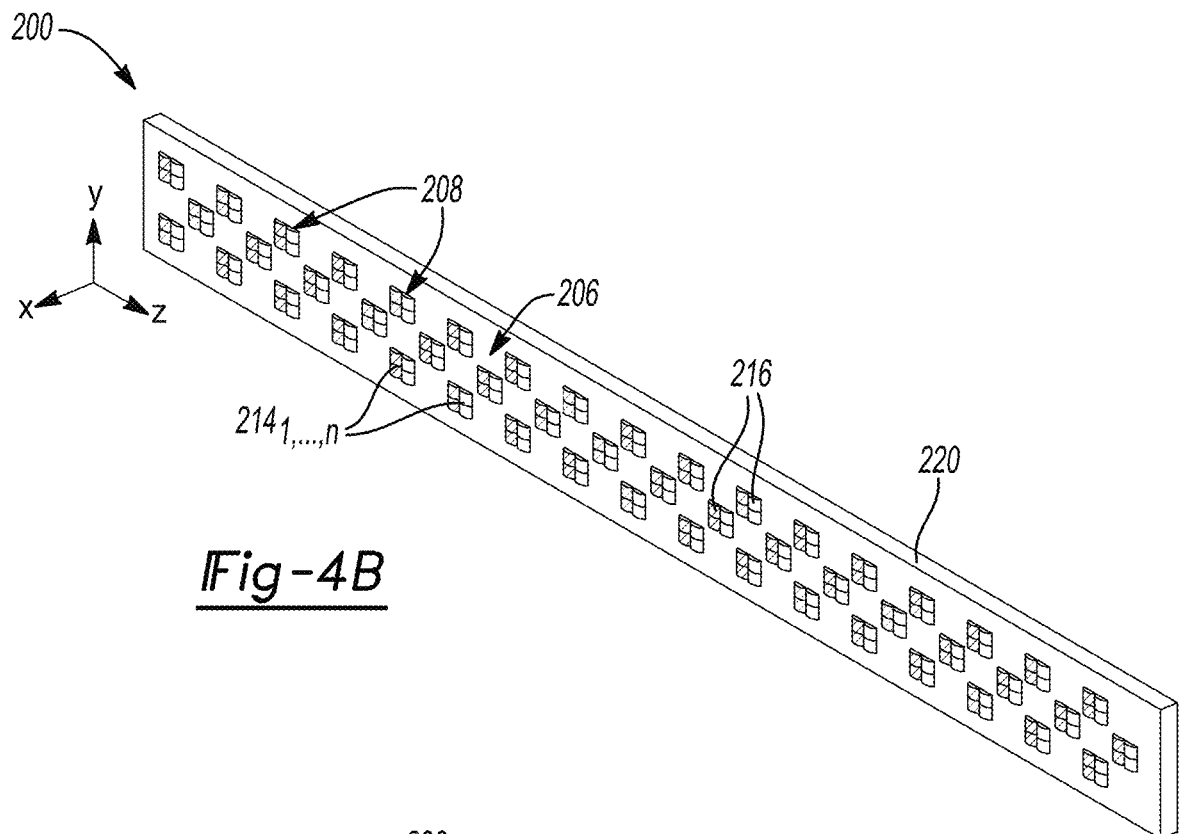
FIG. 4B is a perspective view of a multi-function lighting assembly constructed in accordance with example embodiments.
Figure 4C:
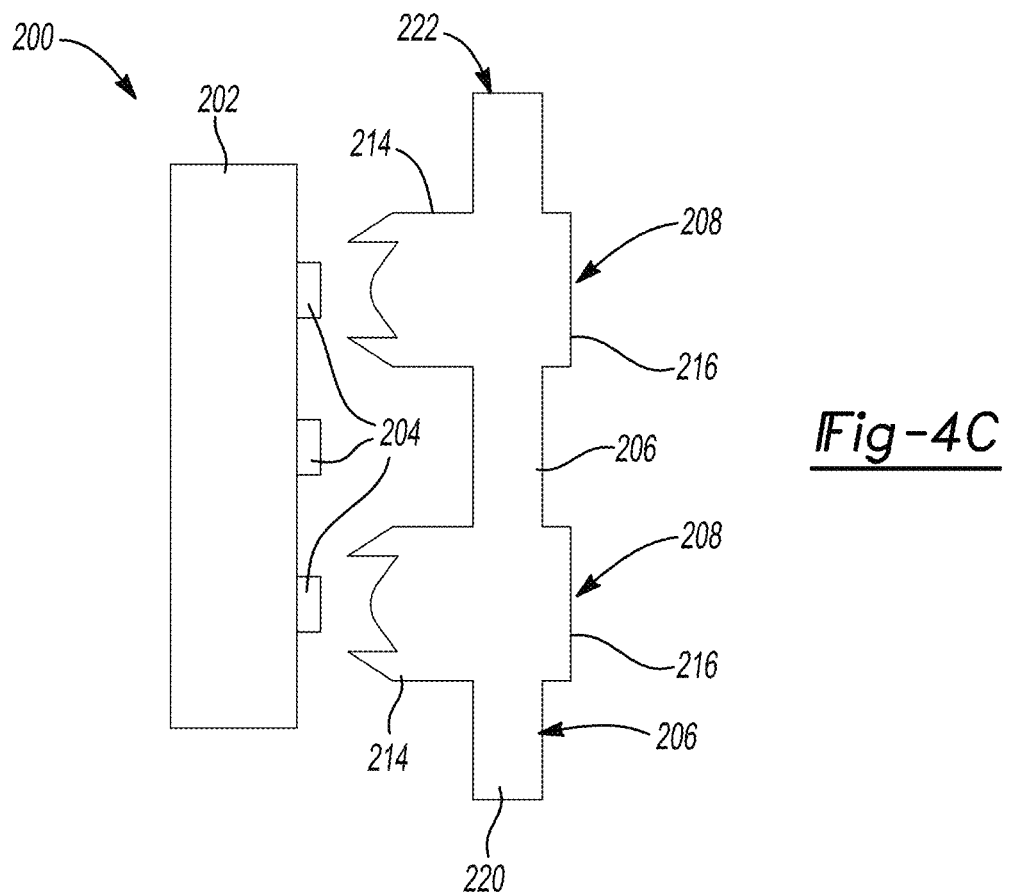
FIG. 4C is a partial cross-section view of a multi-function lighting assembly constructed in accordance with example embodiments.

FIGS. 4A through 4C are different views of the example multi-function lighting assembly 200 constructed in accordance with an illustrative embodiment of the present disclosure. FIG. 4A also depicts a partial cross-section view of an example conventional lamp tail board 101 showing a relative thickness of a substrate 126 for conventional LEDs 128 compared to the thickness of a combination of a substrate 202 for micro or mini LEDs or LED dies $204_{1, \ldots, n}$ and optics assembly 222 of a multi-function lighting assembly 200. More specifically, FIG. 4A shows the conventional LEDs 128, which may have a thickness of 0.6 mm, disposed the substrate 126, which may have a thickness of 1.6 mm.

The multi-function lighting assembly 200 shown in FIGS. 4A through 4C comprises a substrate 202 with LED dies $204_{1, \ldots, n}$. The assembly 200 further comprises an input coupling to an optic assembly (e.g., lens assembly) 222, and a protective cover 224, such as a lens. In some embodiments a lens 106 or 306 of a vehicle lighting module 102, 300 may function as the protective cover 224. FIG. 4A shows the substrate 202, the LED dies $204_{1, \ldots, n}$, and the optic assembly (e.g., lens assembly) 222 of the multi-function lighting assembly 200, together having a thickness that is approximately equal to to the thickness of the substrate 126 together with the conventional LEDs 128 of the conventional lamp tail board 101.

As described below in connection with FIGS. 9A and 9B, the assembly 200 is advantageous because the substrate 202 with LED dies $204_{1, \ldots, n}$ and lens assembly 222 can be universal, that is, conveniently deployed within and configurable for operation within a variety of specific tail light assemblies 300 having conventional LEDs 302 and different printed circuit board (PCB) assemblies 304. The lens assembly 222 comprises a substrate 220 with one or more first optic components 206 for the tail light function and one or more second optic components 208 for the fog light function. The first optic components 206 and/or the second optic components 208 may each include one or more optic components, such as a collimator 214 as described below. The multi-function lighting assembly 200 contains a plurality of mini and/or micro LED dies to realize both tail light and fog light functions in a single module (e.g., single printed circuit board (PCB)). A group of dedicated LED dies $204_{1, \ldots, n}$ are controlled by an LED driver $232_1$ to realize the tail light function, and a different group of dedicated LED dies $204_{1, \ldots, n}$ are controlled by an LED driver $232_2$ to realize the rear fog function. Two LED drivers $232_1$ and $232_2$ are controllable so that the brightness and luminance for tail light function and the rear fog light function can be controlled individually. Specific ones of the LEDs 204, 302 that are associated with the tail light function are labeled "O", and ones of the LEDs 204, 302 that are associated with the fog light function are labeled "X".

With continued reference to FIGS. 3A through 7, an optic component 208 is provided at the output of the LED dies $204_{1, \ldots, n}$ dedicated for the rear fog light function to direct the light of these LED dies. The first optic components 206 may be transparent. Alternatively or additionally, the first optic components 206 may have a selected grain (e.g., CH45 grain). The first optic components 206 may be located separate from second function operation areas 212 on the substrate 220 where the LED dies $204_{1, \ldots, n}$ that are dedicated for the fog light function are disposed. For example, the first optic components 206 may be disposed adjacent to or between the second function operation areas 212. For the rear fog light function, the second optic components 208 each include a collimator 214 placed on or near the output of the LED dies $204_{1, \ldots, n}$ dedicated for the rear fog function in order to direct the light in a manner that will meet lighting regulatory and/or legal requirements for a rear fog light on a vehicle 100. As described below, each of the LED dies $204_{1, \ldots, n}$ dedicated for the rear fog function can be provided with a dedicated collimator 214.

The protective cover 224 for the multi-function lighting assembly 200 can be an outer lens which has a dedicated optics in the area where the assembly 200 is located to ensure final light direction for the rear fog light function and diffusion for the tail light function, which may be required and/or permissible according to lighting regulatory and/or legal requirements for a rear tail light function on a vehicle 100. In other words, the protective cover 224 can function as an outer diffusion layer, thereby allowing each of the two lighting functions or features to achieve their respective luminous intensity targets; otherwise, the assembly 200 may have no cover or lens and is instead deployed in a rear tail light module 300 and behind the module 300's specific tail lens 306. The optical characteristics of the protective cover 224 can be minimized in a way that the protective cover 224 is performing an optical task without any visible aesthetical impact (e.g., without disrupting the uniformity of the lighting output of either function), which represents a significant aesthetic improvement over current solutions that employ a separated rear fog light. Further advantages of the multi-function lighting assembly 200 and its implementation using mini chip LEDs is its ability to place the LED dies $204_{1, \ldots, n}$ close together and thereby avoid dark shadow spots when the LED dies are not activated. Thus, the multi-function lighting assembly 200 can provide both a tail light function with a seamlessly integrated fog light function. As described with FIG. 8, the multi-function lighting assembly 200 has an electrical connection to the rear vehicle lighting module 102 such that the assembly 200 can operate seamlessly together with other light functions such as additional rear vehicle lighting functions (e.g., brake lights, turn signal indicators, and the like).

The mini or micro chip scale package LEDs or their LED dies $204_{1, \ldots, n}$ are disposed on the substrate 202 and distanced sufficiently (a) to provide thermal benefits and relief; (b) to accommodate the lens assembly 222 and its careful alignment of the first optic components 206 and the second optic components 208 over the corresponding LED dies $204_{1, \ldots, n}$ being controlled for their respective lighting function; and (c) to provide or seamless integration of two different lighting functions such that no impact occurs to the homogeneity of LED dies $204_{1, \ldots, n}$ for one lighting function when the interspersed LED dies $204_{1, \ldots, n}$ for the other lighting function are off.

Figure 5:
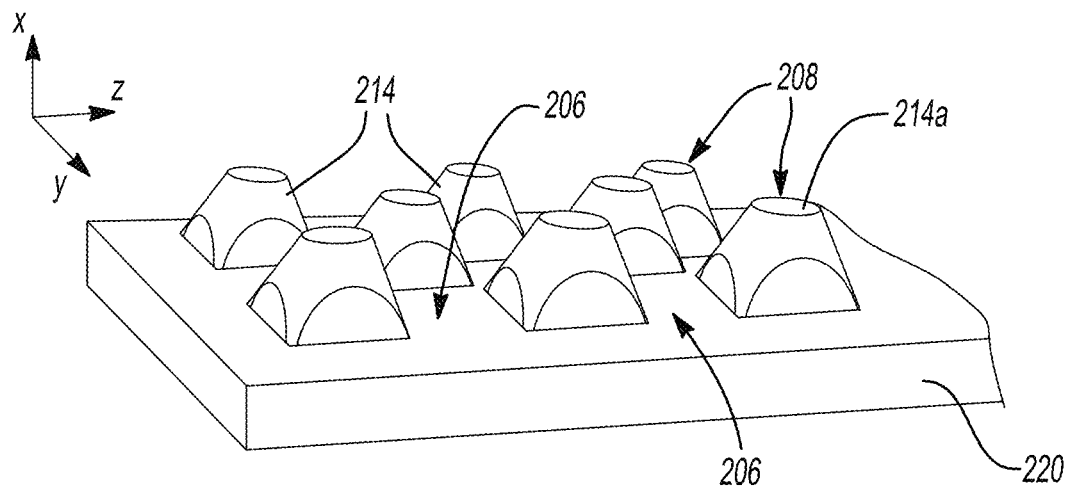
FIGS. 5 and 6 are top and bottom views of a lens assembly in a multi-function lighting assembly that is constructed in accordance with example embodiments.
Figure 6:
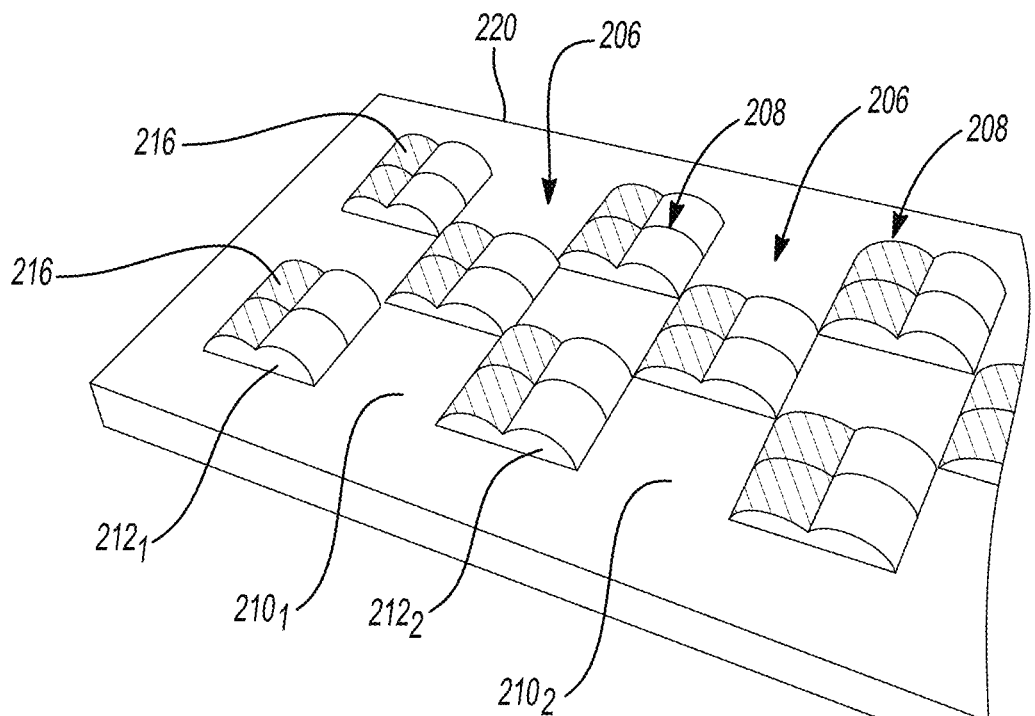

FIGS. 5 and 6 provide example dimensions for optic component 208 on the substrate 220 for the lens assembly 222 of the multi-function lighting assembly 200. In this example, the LED dies $204_{1, \ldots, n}$ that provide the rear fog light function are in a matrix arrangement on the substrate with alternating LED dies $204_{1, \ldots, n}$ that provide the tail light function. As shown in FIG. 6, the substrate 220 has first function operation areas $210_{1, \ldots, n}$ (e.g. for providing a tail light junction) interspersed among second function operation areas $212_{1, \ldots, n}$ (e.g. for providing a rear fog light junction) in a chessboard pattern. The positioning of the LED dies $204_{1, \ldots, n}$ for respective functions in an alternating pattern achieves an advantageous homogeneous appearance for both functions. It is to be understood that the first function operation areas $210_{1, \ldots, n}$ can be arranged in different patterns with respect to the second function operation area(s) $212_{1, \ldots, n}$ such as arranged to be interspersed differently with respect to each other, or not interspersed at all. The specific pattern shape for LED dies $204_{1, \ldots, n}$ for different light functions can be altered such as staggered, dithered, aligned, and so on in order to meet system performance requirements. The lens assembly 222 is configured to arrange the first optic components 206 to be adjacent respective first function operation areas $210_{1, \ldots, n}$ and to arrange the second optic components 208 to be adjacent respective second function operation area(s) $212_{1, \ldots, n}$.

Figure 7:
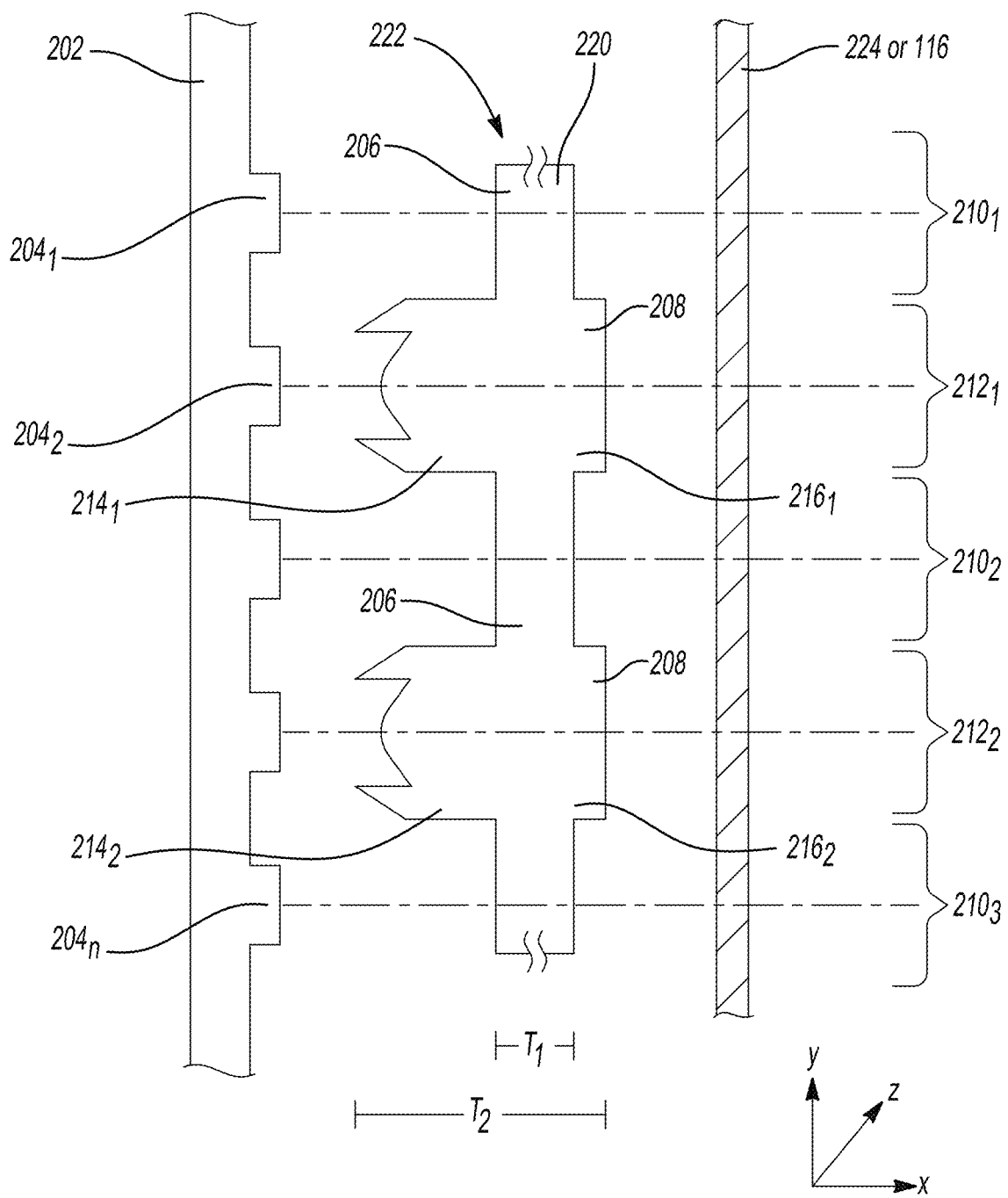
FIG. 7 is a cross-section view of the lens assembly shown in FIGS. 5 and 6.

As shown by the arrangement of the first optic components 206 and the second optic components 208 depicted in FIGS. 5, 6 and 7, the thickness of the lens assembly 222 can vary among the function operation areas 210, 212. In other words, the thickness $T_1$ of the lens assembly 222 at the first function operation areas $210_{1, \ldots, n}$ can be different than the thickness $T_2$ at the second function operation areas $212_{1, \ldots, n}$. The respective thicknesses of a first optic (e.g., the first optic components 206) and a second optic (e.g., the second optic components 208) may vary in accordance with a selected pattern of locations of the one or more second function operation areas $212_{1, \ldots, n}$ of the Y-Z plane that correspond to the second optic disposed relative to the one or more first function operation areas $210_{1, \ldots, n}$ of the Y-Z plane that correspond to the first optic.

With continued reference to FIGS. 5, 6 and 7, the first optic components 206 for the tail light function can be a stronger grain than is used for areas of the substrate 202 with LED dies 204 that will be collimated for the fog light function. For example, the first optic components 206 for the tail light function can use a selected grain to spread light and reach a desired photometry. The second optic components 208 for the rear fog light function can comprise, for example, a collimator 214 that is arranged with an input coupling to the output to a corresponding one of the LED dies $204_{1, \ldots, n}$ driven for the second function (e.g., rear fog light function). A collimator 214 can be a TIR lens using refraction and total internal reflection as working principle. The collimator 214 is, in turn, disposed over a lens 216 such as a 2×2 pillow lens for fog photometry optimization. Thus, the second function operation areas $212_{1, \ldots, n}$ can have a greater thickness $T_2$ than the first function operation areas $210_{1, \ldots, n}$ as illustrated in FIG. 7. In the illustrated example, LED dies $204_{1, \ldots, n}$ are smaller than 0.5 millimeters (mm). The collimators 214 have an input portion 214 configured to receive light from the LED dies $204_{1, \ldots, n}$, and with a circular shape having a radius on the order of 0.5 mm. The collimators 214 may be spaced apart by an LED step distance (e.g., center axis of collimator 214 to center axis of an adjacent collimator 214) of 3.62 mm, and an LED to collimator distance of 0.25 mm in the X-plane. The distance between LED dies $204_{1, \ldots, n}$ of the same function can be, in this example, on the order of 3.6 mm in the Y-axis and 3.0 mm in the Z-axis. The distance between LEDs $204_{1, \ldots, n}$ of different function can be on the order of 1.8 mm in the Y-axis and 1.5 mm in the Z-axis. The substrate 220 may have a thickness of about 0.75 mm.

Illustrative embodiments of the present disclosure are advantageous at least because of the density of the LED dies $204_{1, \ldots, n}$, and the versatility and accuracy of placement of optics (e.g., the first optic components 206 and the second optic components 208) for respective ones of multiple lighting functions provided by the multi-function lighting assembly 200, which can have very distinct optic requirements. For example, a second function can collimate light via a second optic (e.g., the second optic components 208) whereas a first function does not collimate light via a first optic (e.g., the first optic components 206). The first function can diffuse light via the first optic (e.g., the first optic components 206), whereas the second function collimates light via the second optic (e.g., the second optic components 208). For example, the light pattern generated at the output side of the lens assembly 222 first function operation areas 210 can be wide compared to the light pattern generated at the output side of the lens assembly 222 second function operation areas 212 (e.g., a pattern with a verticality of about 15 degrees and about 45 degrees horizontally for the tail light function, versus a pattern with a verticality of about 5 degrees and about 10 degrees horizontally for the rear fog light function). The first optic (e.g., the first optic components 206) can comprise a light filter or be transparent or have a selected grain, whereas the second optic (e.g., the second optic components 208) can comprise a plurality of collimators 214 disposed at outputs of selected ones of the LED-dies 204 on the substrate 202. In an alternative embodiment, the second optic 208 can be arranged on a substrate 220 that has cutouts for the first function operation areas $210_{1, \ldots, n}$. The substrate 202 with the LED dies $204_{1, \ldots, n}$, and the substrate 220 with cutouts for the first function operation areas $210_{1, \ldots, n}$ can, in turn, be employed with a particular rear lamp inner tail lens, for example, as shown in FIGS. 9A and 9B. In the example multi-function lighting assembly 200, luminous flux per LED-die on the order of 0.6 lumen (lm) per LED can be achieved for the tail light function, and luminous flux per LED-die on the order of 1.4 lm per LED can be achieved for the rear fog light function. In the function example of a multi-function lighting assembly 200 providing a tail light function and a rear fog light function, the second optic components 208 and LED dies for the rear fog light function are arranged and driven to meet the desired fog light luminosity requirement or regulation, and then the first optic components 206 and LED dies for the tail light function can be tuned to match with the tail light or other vehicle lighting module 102 hosting the multi-function lighting assembly 200. Tail light flux from the LED dies $204_{1, \ldots, n}$ operated for the tail light function can also be increased to better meet the tail light requirement or regulation.

Figure 8:
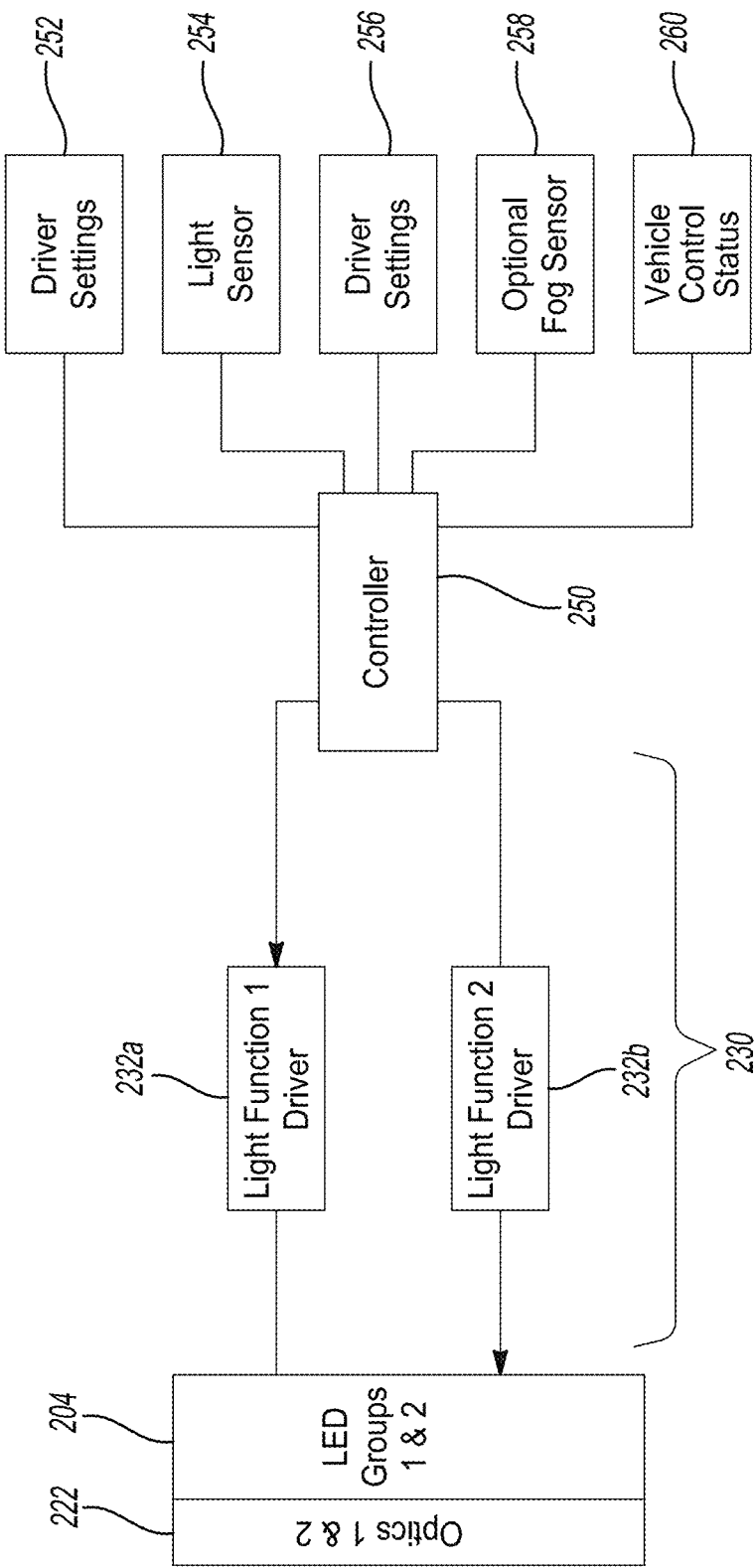
FIG. 8 is a block diagram of an example control system for a multi-function lighting assembly in accordance with example embodiments.

With reference to FIG. 8, the respective light functions provided by a multi-function lighting assembly 200 constructed in accordance with example embodiments of the present disclosure can be controlled using a controller indicated generally at 230 that comprises at least drivers 232a and 232b for driving respective groups of the LED dies $204_{1, \ldots, n}$, for at least two light functions. It is to be understood that additional drivers 232n can be used for other driving groups of LED dies $204_{1, \ldots, n}$, on the substrate 202 in the multi-function lighting assembly 200 for additional lighting functions. The lens assembly 222 can also comprises optics for additional functions. The drivers 232a, b are controlled by a controller 250 connected to a vehicle bus such as a Controller Area Network (CAN) bus or Local Interconnect Network (LIN) bus in the vehicle 100. The controller can be the vehicle 100 electronic control unit (ECU), or a part of the multi-function lighting assembly 200 or a part of the vehicle lighting module 102 and connected via a separate wiring harness to the ECU. The controller 250 controls the drivers 232a, b based on inputs from one or more sources in the vehicle such as driver settings 252 (e.g., turn indicators, or manual on/off switch for rear fog light feature), light sensor 254 (e.g., for automatic operation of headlights), camera 256, optional fog sensor 258 (e.g., for automatically turning on a fog light feature) and various vehicle control settings (e.g., engine powered on, brakes activated, and so on). The drivers 232a, b can be controlled independently and operate different groups of the LED dies $204_{1, \ldots, n}$, at different times and at different intensities depending on the light function being achieved.

Figure 9A:
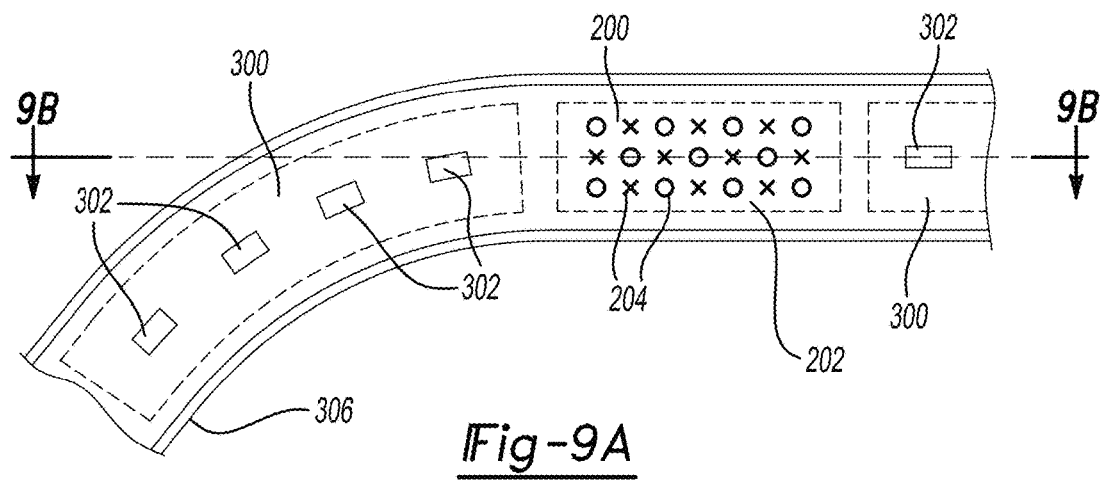
FIGS. 9A and 9B are planar and cross-sectional diagrams of a multi-function lighting assembly constructed in accordance with example embodiments deployed in an example inner tail lens of an example vehicle rear lamp.
Figure 9B:
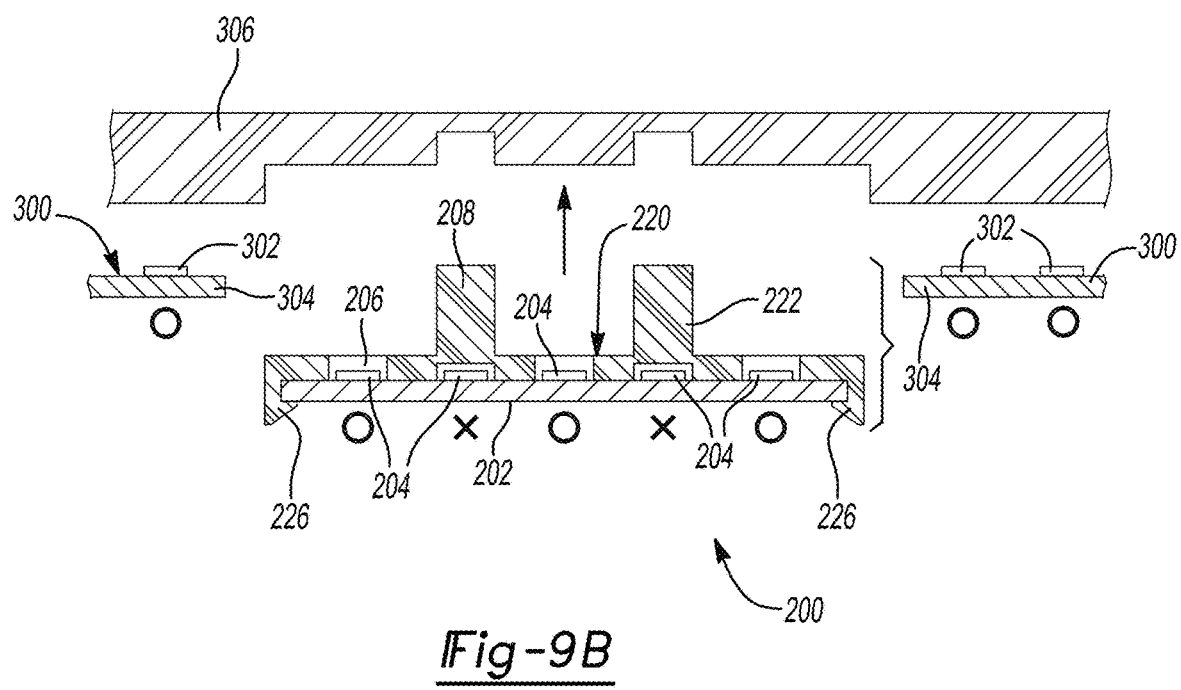

With reference to FIGS. 9A and 9B, the multi-function lighting assembly 200 constructed in accordance with example embodiments of the present disclosure is advantageous because it minimizes the package need or space for an integrated lighting function such as a rear fog function integrated into a vehicle tail lamp, and also provides a universal form factor for convenient and seamless deployment into a vehicle lamp having other LEDs and specific lighting design lens. FIG. 9A and FIG. 9B are, respectively, planar and cross-sectional diagrams of a multi-function lighting assembly 200 constructed in accordance with example embodiments deployed with an example inner tail lens 306 of an example vehicle rear tail lamp 300. In the multi-function lighting assembly 200 the substrate 202 combines controllable mini or micro LEDs or LEDs dies $204_{1, \ldots, n}$ for at least two light functions as described herein on a single printed circuit board assembly (PCBA) wherein the respective LEDs $204_{1, \ldots, n}$ for these light functions can be interspersed among each other or otherwise controllable in two patterns or shapes and guided by the first optic components 206 and the second optic components 208 for these light functions in respective first function operation areas 210 and second function operation areas 212 on a substrate 202 aligned with the PCBA 202. The PCBA 202 can have the LED drivers thereon or an interface to LED drivers located elsewhere. The PCBA 202 with LEDs $204_{1, \ldots, n}$ can be deployed with an optic block or module 220 (e.g., substrate 202 having the optic components 206, 208), and a mechanism 226 (e.g., clips, screws, glued interface, and so on) to detachably or permanently secure the optic block 220 to the PCBA 202 to provide a universal multi-function lighting assembly 200.

With continued reference to FIGS. 9A and 9B, the universal multi-function lighting assembly 200 can be provided with another mechanism (e.g., clips, screws, glued interface, and so on) to detachably or permanently secure the multi-function lighting assembly 200 within a vehicle lamp 102 such as adjacent an inner tail lens 306 of a vehicle rear lighting module. Because of its compact size, the universal multi-function lighting assembly 200 can be conveniently and compactly co-located with other PCBAs 300 associated with the inner tail lens 306. The inner tail lens 306 can be shaped to accommodate the varying depths of the optic components 206, 208 of the optic block 220. In FIGS. 9A and 9B, the PCBA 200 is shown disposed between two tail light function PCBAs 300. $204_{1, \ldots, n}$ indicated as "O" in FIGS. 9A and 9B represent LEDs providing a tail light function provided across both types of PCBAs 200 and 300 to illustrate seamless integration of the multi-function lighting assembly 200. The $204_{1, \ldots, n}$ indicated as "X" in FIGS. 9A and 9B represent LEDs providing a fog light function provided in the multi-function lighting assembly 200 and therefore within the same inner tail lens as the $204_{1, \ldots, n}$ indicated as "O" to show compact and universal placement of a second light function (e.g., a fog light function) in the same rear tail light assembly.

The implementations, examples, and illustrations described herein may be combined. Also, the components and devices described herein may be implemented in a number of ways. For example, system(s), method(s), computer-readable media/instructions, module(s), algorithms, hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), and/or technique(s) can be used to implement the multi-function lighting assembly 200 and different vehicle lighting applications as described in the present disclosure. Although his disclosure describes techniques, components and products that are well-suited to lighting using unpackaged LEDs, example embodiments of the present disclosure can also be implemented using packaged LEDs.

Example embodiments described herein are implemented at the assembly level, that is, after LED dies are disposed on a "circuit substrate). The term "circuit substrate" and/or alternatively, "substrate," can include, but is not limited to: a paper, glass, or polymer substrate formed as a sheet or other non-planar shape, where the polymer—translucent or otherwise—may be selected from any suitable polymers, including, but not limited to, a silicone, an acrylic, a polyester, a polycarbonate, etc.; a circuit board (such as a printed circuit board (PCB)); a string or thread circuit, which may include a pair of conductive wires or "threads" extending in parallel; and a cloth material of cotton, nylon, rayon, leather, etc. The choice of material of the substrate 202, as discussed herein, may include durable materials, flexible materials, rigid materials, and/or other materials which maintain suitability for the end use of the product. Further, a substrate, such as a circuit substrate, may be formed solely or at least partially of conductive material such that the substrate acts as a conductive circuit for providing electricity to an LED die 204.

Illustrative embodiments of the present disclosure use high-volume micro and mini-LEDs for vehicle 100 lighting applications. Thin-film mini and micro LEDs are applied to any surface with microscopic accuracy, and differing light guides are accurately aligned to respective ones of the LEDs with similar granularity and accuracy to achieve two or more lighting functions requiring distinct or differentiated optics in the same light assembly for an advantageous range of applications for exterior and interior lighting. For example, front and/or rear vehicle lighting modules 102 can be provided with a substrate comprising arrangements of high-volume micro and mini-LEDs 204, different groups of which are aligned with different optic components and controlled independently for different combinations of functions chosen from, but not limited to, brake lights, turn signals, daytime running lights, head lights, tail lights, front and rear fog lights and other lights provided via front and/or rear vehicle lighting modules 102. The substrate with arrangements of high-volume micro and mini-LEDs 20 and different optics and drive functions can also be used for interior lighting applications such as dashboard indicators, interior lighting (e.g. dome and door lights) and decorative, stylized lighting along contours of vehicle seats, door panels, consoles, and other interior vehicle surfaces.

The multi-function lighting assembly 200 of the illustrated embodiments is much thinner than conventional vehicle light modules and can be flexible for curved molding to the contour of a vehicle lift gate or other part of vehicle exterior body, or within vehicle interior (e.g., dashboard, lighting embedded in seat fabric or molded arm rest or other interior surface) for more uniform, distinctive, stylized lighting designs and patterns. The multi-function lighting assembly 200 can achieve superior brightness to conventional vehicle light modules and at a fraction of the energy needed by conventional vehicle light modules to achieve the same or even less brightness to achieve high-performance, high-efficiency vehicle lighting with greater styling freedom (i.e., in terms of cost, aesthetics and versatility) than conventional vehicle lighting technologies. In accordance with an advantageous aspect of the multi-function lighting assembly (200), the substrate with LEDs and the optics substrate 220 can be employed as a universal board for seamless and convenient integration into various rear lamps having specific inner tail lenses as described with reference to FIGS. 9A and 9B.

The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the present disclosure. In some example embodiments, well-known processes, well-known device structures, and well-known technologies are not described in detail, as they will be readily understood by the skilled artisan in view of the disclosure herein.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top," "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. An exterior vehicle lighting assembly, comprising:
   a multi-function light module including a first plurality of light emitting diodes (LEDs) chosen from mini-LEDs, micro-LEDs and LED-dies and including a first group of the first plurality of LEDs mounted on a substrate and configured to illuminate to provide a first function, and a second group of the first plurality of LEDs mounted on the substrate and configured to illuminate to provide a second function that is different from the first function,
   wherein the multi-function light module further includes an optics assembly with a first optic component configured for the first function and second optic component configured for the second function, the optics assembly being disposed relative to the first plurality of LEDs to guide light output from respective LEDs of the first group of the first plurality of LEDs via the first optic component and to guide light output from respective LEDs of the second group of the first plurality of LEDs via the second optic component;
   a printed circuit board (PCB) with a second plurality of LEDs configured to illuminate to provide the first function; and
   a lens overlying each of the PCB and the first optic component and the second optic component of the multi-function light module.

2. The exterior vehicle lighting assembly of claim 1, wherein the exterior vehicle lighting assembly presents a uniform appearance across the multi-function light module and the PCB with each of the first group of the first plurality of LEDs and the second plurality of LEDs each being illuminated for the first function.

3. The exterior vehicle lighting assembly of claim 1, wherein the second function of the multi-function light module includes at least one of: a brake light function, a turn signal function, a daytime running light function, a headlight function, a tail light function, a front fog light function, or a rear fog light function.

4. The exterior vehicle lighting assembly of claim 1, wherein the multi-function light module is surrounded on at least two opposite sides by one or more other light modules, and wherein the one or more other light modules include the PCB with the second plurality of LEDs.

5. The exterior vehicle lighting assembly of claim 1, wherein the first group and the second group of the first plurality of LEDs of the multi-function light module are configured to be operated at different intensities depending on a corresponding one of the first function or the second function to be achieved.

6. The exterior vehicle lighting assembly of claim 1, wherein the first group of the first plurality of LEDs are interspersed with the second group of the first plurality of LEDs to present a uniform appearance with only one of the first group of the first plurality of LEDs or the second group of the first plurality of LEDs being illuminated.

7. The exterior vehicle lighting assembly of claim 1, wherein the second optic component comprises a plurality of collimators and a plurality of pillow lenses, each collimator of the plurality of collimators has an input portion configured to receive light from a corresponding LED of the second group of the first plurality of LEDs, and each pillow lens of the plurality of pillow lenses is disposed at an output of a corresponding collimator of the plurality of collimators to receive collimated light therefrom.

8. The exterior vehicle lighting assembly of claim 1, wherein the second optic component is arranged on an optic substrate, and wherein the optic substrate defines cutouts in areas that are aligned with corresponding LEDs of the first group of the first plurality of LEDs.

9. A tail light assembly for a vehicle, comprising:
a multi-function light module including a first plurality of light emitting diodes (LEDs) chosen from mini-LEDs, micro-LEDs and LED-dies and including a first group of the plurality of LEDs mounted on a substrate, and a second group of the plurality of LEDs mounted on the substrate; and
a printed circuit board (PCB) with a second plurality of LEDs and configured to provide a tail light function,
wherein the multi-function light module further includes an optics assembly with a first optic component configured for the tail light function and second optic component configured for a second function that is different from the tail light function, the optics assembly being disposed relative to the first plurality of LEDs to guide light output from respective LEDs of the first group of the first plurality of LEDs via the first optic component and to guide light output from respective LEDs of the second group of the first plurality of LEDs via the second optic component, and
wherein the tail light assembly presents a uniform appearance across the multi-function light module and the PCB with each of the first group of the first plurality of LEDs and the second plurality of LEDs each being illuminated for the tail light function.

10. The tail light assembly of claim 9, wherein the second function of the multi-function light module includes at least one of: a brake light function, a turn signal function, or a rear fog light function.

11. The tail light assembly of claim 9, further comprising a lens overlying each of the PCB, the first optic component, and the second optic component of the multi-function light module.

12. The tail light assembly of claim 9, wherein the first group and the second group of the first plurality of LEDs of the multi-function light module are configured to be operated at different intensities depending on a corresponding one of the tail light function or the second function to be achieved.

13. A multi-function light module for a vehicle, comprising:
a plurality of light emitting diodes (LEDs) chosen from mini-LEDs, micro-LEDs and LED-dies and including a first group of the plurality of LEDs mounted on a substrate, and a second group of the plurality of LEDs mounted on the substrate; and
an optics assembly with a first optic component configured for a first function and second optic component configured for a second function that is different from the first function, the optics assembly being disposed relative to the plurality of LEDs to guide light output from respective LEDs of the first group of the plurality of LEDs via the first optic component and to guide light output from respective LEDs of the second group of the plurality of LEDs via the second optic component,
wherein the first group of the plurality of LEDs are interspersed with the second group of the plurality of LEDs to present a uniform appearance across the multi-function light module with only one of the first group of the plurality of LEDs or the second group of the plurality of LEDs being illuminated.

14. The multi-function light module of claim 13, wherein the second optic component comprises a plurality of collimators and a plurality of pillow lenses, each collimator of the plurality of collimators has an input portion configured to receive light from a corresponding LED of the second group of the plurality of LEDs, and each pillow lens of the plurality of pillow lenses is disposed at an output of a corresponding collimator of the plurality of collimators to receive collimated light therefrom.

15. The multi-function light module of claim 14, wherein the plurality of pillow lenses are spaced apart from one another and interspersed with the first optic component configured for the first function.

16. The multi-function light module of claim 13, wherein at least one of the first function or the second function of the multi-function light module includes at least one of: a brake light function, a turn signal function, a daytime running light function, a headlight function, a tail light function, a front fog light function, or a rear fog light function.

17. The multi-function light module of claim 13, wherein the second optic component is arranged on an optic substrate, and wherein the optic substrate defines cutouts in areas that are aligned with corresponding LEDs of the first group of the plurality of LEDs.

18. The multi-function light module of claim 13, wherein at least one of the first function or the second function diffuses light via a corresponding one of the first optic component or the second optic component, and
wherein another one of the first function or the second function collimates light via a corresponding one of the first optic component or the second optic component.

19. The multi-function light module of claim 13, wherein at least one of the first optic component or the second optic component includes a light filter.

20. A vehicle lighting module including the multi-function light module of claim 13, and wherein the vehicle lighting module is configured to extend along a vehicle body structure.

* * * * *